(12) United States Patent
Wankawala (10) Patent No.: US 9,378,228 B2
(45) Date of Patent: Jun. 28, 2016

(54) ENTERPRISE RESOURCE PLANNING RUNNING ON MULTIPLE DATABASES

(71) Applicant: SAP SE, Walldorf (DE)

(72) Inventor: Pranav Wankawala, Palo Alto, CA (US)

(73) Assignee: SAP SE, Walldorf (DE)

( * ) Notice: Subject to any disclaimer, the term of this patent is extended or adjusted under 35 U.S.C. 154(b) by 181 days.

(21) Appl. No.: 13/791,657

(22) Filed: Mar. 8, 2013

(65) Prior Publication Data

US 2014/0258230 A1   Sep. 11, 2014

(51) Int. Cl.
*G06F 17/30* (2006.01)

(52) U.S. Cl.
CPC .......... *G06F 17/303* (2013.01); *G06F 17/3056* (2013.01); *G06F 17/30371* (2013.01); *G06F 17/30424* (2013.01); *G06F 17/30575* (2013.01)

(58) Field of Classification Search
CPC .............. G06F 17/30575; G06F 17/30445; G06F 17/30; G06F 17/30424; G06F 17/30578; G06F 17/30902; G06F 2201/80; G06F 17/3048
USPC .................. 707/609–639, 758–764, 781–782
See application file for complete search history.

(56) References Cited

U.S. PATENT DOCUMENTS

| 7,765,186 B1* | 7/2010 | Hu ..................... G06F 17/30578 707/612 |
| 7,805,706 B1* | 9/2010 | Ly .......................... G06F 9/5083 709/221 |
| 8,332,349 B1* | 12/2012 | Wilson ................... G06Q 40/06 707/607 |
| 8,386,734 B2* | 2/2013 | Chen ............................ 711/165 |
| 2002/0065899 A1* | 5/2002 | Smith et al. .................. 709/214 |
| 2003/0237081 A1* | 12/2003 | Taylor ....................... G06F 8/65 717/168 |
| 2011/0055242 A1* | 3/2011 | Mehrotra et al. ............ 707/769 |
| 2011/0153568 A1* | 6/2011 | Shang ................. G06F 11/2094 707/648 |
| 2012/0158650 A1* | 6/2012 | Andre ............... G06F 17/30457 707/611 |
| 2012/0265725 A1* | 10/2012 | Werner ........................ 707/600 |
| 2012/0278344 A1* | 11/2012 | Berg ................... G06F 17/3048 707/754 |
| 2012/0310975 A1* | 12/2012 | Oliver .............. G06F 17/30545 707/769 |
| 2013/0036115 A1* | 2/2013 | Schwarz et al. ............. 707/736 |
| 2013/0232176 A1* | 9/2013 | Plattner et al. ............... 707/803 |
| 2013/0238657 A1* | 9/2013 | Brand ............... G06F 17/30457 707/770 |
| 2013/0290665 A1* | 10/2013 | Heidel et al. .................. 711/171 |

* cited by examiner

*Primary Examiner* — Michelle Owyang
(74) *Attorney, Agent, or Firm* — Schwegman Lundberg & Woessner, P.A.

(57) ABSTRACT

A system and method for running an application on multiple databases is described. A selection of data stored in a database to be used in conjunction with an in-memory database is identified. A selection of a storage mode corresponding to a dual system storage mode or a source system storage mode is received. The selection of data is initialized in the in-memory database. An entry corresponding to the selection of data is generated in a lookup table when the dual system storage mode is selected.

15 Claims, 6 Drawing Sheets

ENTERPRISE RESOURCE PLANNING RUNNING ON MULTIPLE DATABASES

FIELD

The present disclosure relates generally to database access, and in a specific example embodiment, to enabling an enterprise resource planning application to operate on multiple databases.

BACKGROUND

Replication tools are used to replicate data from a source enterprise resource planning (ERP) system and move the copy to an in-memory system for further processing. Once the replicated data is in the in-memory system, analytics is performed on the copy of the data. However, all transactions are still performed in the ERP system and rely on these replication tools to propagate changes to the data from the in-memory system causing the following problems:

Two tables with the same data in different database systems may result in multiple sources of truth.

Relying on replication to push the data causes time lags and delays between the systems.

Writing directly in the in-memory system adds the additional complications of writing the data back to the ERP system to keep both the tables synchronized.

Locks may need to be placed in both the systems when writing in the in-memory system to avoid data inconsistencies.

As previously mentioned, users who wish to use the in-memory system are currently limited to operating the in-memory system in a read-only mode because writing transaction data directly into the in-memory system may result in inconsistent data between the systems. As such, users are typically reluctant to abandon their existing ERP system and to migrate their entire business application system to the in-memory system. Furthermore, not all tables of a particular feature in existing ERP system can be moved to the in-memory system because there may be seven dependencies in the ERP system where one table may be called out by several applications.

BRIEF DESCRIPTION OF DRAWINGS

The appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description for purposes of explanation, numerous specific details are set forth in order to provide an understanding of various embodiments. It will be evident, however, to those skilled in the art that embodiments of the inventive subject matter may be practiced without these specific details. In general, well-known instruction instances, protocols, structures, and techniques have not been shown in detail.

Examples of a system and method for running an application on multiple databases are described. In one embodiment, a selection of data stored in a database to be used in conjunction with an in-memory database is identified. A selection of a storage mode corresponding to a dual system storage mode or a source system storage mode is received. The selection of data is initialized in the in-memory database. An entry corresponding to the selection of data is generated in a lookup table when the dual system storage mode is selected.

In one embodiment, data from the selection of data is accessed and updated in the database. The updated data from the selection of data in the database is replicated to the in-memory database when the source system storage mode is selected.

In one embodiment, the system verifies that the selection of data is the same in both the database and the in-memory database after the initialization. The system receives instructions from a replication server to switch off a table corresponding to the selection of data in a business application when the dual system storage mode is selected.

In one embodiment, a query interpreter of the system receives a query from a business application for data from a business application database. The database may include the business application database.

In one embodiment, the system determines whether the lookup table in the business application includes the data in the query. The system routes the query to the in-memory database when the lookup table includes an entry corresponding to the data in the query. Alternatively, the system routes the query to the business application database when the lookup table does not include any entry corresponding to the data in the query.

In one embodiment, the initialization includes replicating the selection of data stored in the database to the in-memory database.

In another embodiment, the system builds a new application based on the selection of data in the in-memory database. The system may then generate new data using the new application. The new data may then be stored directly in the in-memory database without replicating the new data from the in-memory database back to the database.

This present description highlights one embodiment of an approach to modify the code of a business application to enable the application to work with multiple databases. One approach is to have a single source of truth for the business application and have only one real-time productive, table across the two databases versus the traditional database on which the business application currently runs and the new in-memory database (e.g., HANA from SAP Inc).

Currently, when a customer starts a request to replicate data from a source business application system into an in-memory database system, a replication system (such as a replication server) picks up the table information from the source business application system and sets up an initial load of the data into the in-memory database system. Once the initialization of the data into the in-memory database system is over, real time replication begins. In contrast, with the presently described approach, when the user starts a replication request, the replication tool first initiates the initial load. Once the initial load is over, the name of this table is entered in a lookup table on the business application side.

When a request comes to lock, update, select, insert, or delete this table, a DBSL (database connection layer) layer on the business application side checks to see if this table is present in the lookup table. If the table is present in the lookup table, the system then mutes the request onto the in-memory database system. If the table is not present in the lookup table, the system then sends the request to the original database table. Example embodiments are described below.

Figure 1:
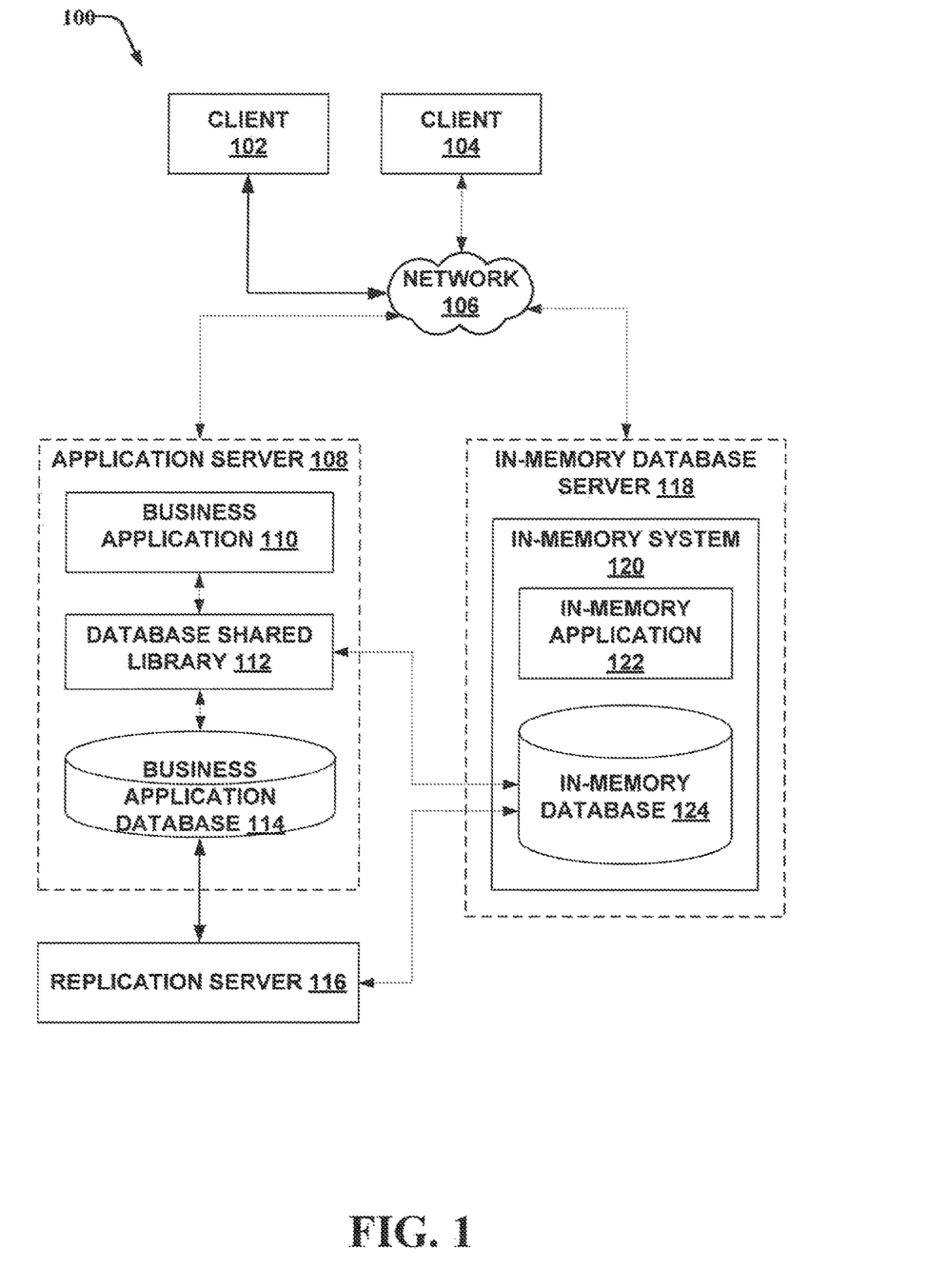
FIG. 1 is a block diagram illustrating an example of a system in which embodiments may be practiced.

With reference to FIG. 1, a system 100 in which example embodiments may be practiced is shown. The system 100 comprises clients 102 and 104 accessing an application server 108 and/or an in-memory database server 118. Clients 102 and 104 are communicatively coupled to the application server 108 and the in-memory database server 118 via a computer network 106. The computer network 106 may comprise, for example, one or more of a wired or wireless network, a local area network (LAN), or a wide area network (WAN).

In one embodiment, the application server 108 may include, for example, a business application 110, a database shared library 112, and a business application database 114. The in-memory database server 118 may include, for example, an in memory system 120 made up of an in-memory application 122, and an in-memory database 124. The in-memory database 124 may include a database management system that primarily relies on main memory for computer data storage. It is contrasted with database management systems that employ is disk storage mechanism. One example of an in-memory database is the HANA system from SAP AG of Walldorf, Germany.

The application server 108, the in-memory database server 118, and clients 102 and 104 may each be implemented in a computer system, in whole or in part, as described with respect to FIG. 1. The business application 110 may include an enterprise business application software application also referred to as an ERP system.

Clients 102 and 104 may be associated with users (not shown). The users may be a human user (e.g., a human being), a machine user (e.g., a computer configured by a software program to interact with the clients 102 and 104), or any suitable combination thereof (e.g., a human assisted by a machine, or a machine supervised by a human). The user is not part of the network environment 100, but is associated with the client 102 or 104 and may be a user of the device 102 or 104. For example, the client 102 or 104 may be a desktop computer, a vehicle computer, a tablet computer, a navigational device, a portable media device, or as smart phone belonging to the user. Likewise, the user is not part of the network environment 100, but is associated with the client 102 or 104. As an example, the client 102 or 104 may be a desktop computer, a vehicle computer, a tablet computer, a navigational device, a portable media device, or a smart phone belonging to the user.

Accordingly, the application server 108 and the in-memory database server 118 as part of a network-based system) may provide one or more web services to one or more clients (e.g., client 103 and 104). One or both of the devices 102 and 104 may be a mobile device (e.g., a smart phone, vehicle computer, or a tablet computer) through which a user may access and use the one or more web services provided by the application server 108 and the in-memory database server 118.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 1. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 106 may be any network that enables communication between or among machines, databases, and devices (e.g., the application server 108, the in-memory database server 118, the replication server 116, and clients 102 and 104). Accordingly, the network 106 may be a wired network, a wireless network (e.g., a mobile or cellular network), or any suitable combination thereof. The network 106 may include one or more portions that constitute a private network, a public network (e.g., the Internet), or any suitable combination thereof.

With respect to the application server 108, the business application 110 may include a software application configured to compute business processes such as projecting sales, keeping track of inventory, computing sales for items based on location and time, and so forth. The business application database 114 may be configured to store data related to the business application 110. Such data may include for example, sales figures, employment figures, costs, projected revenues, delay percentages, inventory stock management, sales amount, and so forth.

In one embodiment, the application server 108 may receive a selection of data in the business application database 114 for which to operate as a dual mode storage system. One embodiment of the business application 110 is further described, below with respect to FIG. 2. The database shared library 112 may be configured to enable and help operate the dual mode storage system when coupled to the business application 110. One embodiment of the database shared library 112 is further described below with respect to FIG. 3.

The replication server 116 may be configured to copy or duplicate at least a portion of the business application database 114 of the application server 108 to the in-memory database 124 of the in-memory database server 118 and vice-versa. In another embodiment, the replication server 116 duplicates only data relevant to the business application 110 from the business application database 114 to/from the in-memory database 124. In other words, only tables that are used in the business application are replicated to the in-memory database 124. In yet another embodiment, the replication server 114 duplicates the entire data in the database 114 to the in-memory database 124. The selection may data may be performed automatically based on predefined parameters, or may be selected manually by a user.

The in-memory system 120 may be configured to operate and compute on data stored in a physical memory such as RAM. For example, the in-memory system 120 includes the in-memory application 122 for operating on data from the in-memory database 124. In one embodiment, the business application 110 may instruct the in-memory application 122 on how to operate the data in the in-memory database 124. A calculation engine (not shown) may be configured to prepare data for computation at the in-memory application 122.

Any one or more of the modules or applications described herein may be implemented using hardware (e.g., a processor of a machine) or a combination of hardware and software. For example, any module or application described herein may configure a processor to perform the operations described herein for that module. Moreover, any two or more of these modules or applications may be combined into a single module, and the functions described herein for a single module may be subdivided among multiple modules or applications. Furthermore, according to various example embodiments, modules and applications described herein as being implemented within a single machine, database, or device may be distributed across multiple machines, databases, or devices.

The present disclosure describes a system architecture where the business application 110 runs on top of the in-memory system 120 directly as well as in a side car system architecture where the in-memory system 120 runs in parallel to the database 114 on which the business application 110 runs. This solution provides some of following benefits:

Single Source of Truth:

Because the table resides in one database either in the in-memory database 124 or the original database 114, data is no longer duplicated between the in-memory database 124 and the original database 114, providing a single source of truth. By avoiding data duplication between several systems or sources of data, data inconsistencies may be avoided.

Ease of writing directly to the in-memory database:

As the replicated table resides only in the in-memory system 120, next generation application software may be then built directly on top of the in-memory system 120 without having to worry about replicating the data back to the original database 114 of the business application system 110. The in-memory system 120 would take care of all the locking issues when there are simultaneous requests for data from multiple sources.

Avoiding time delays:

Updates are directly performed on the in-memory system 120. As such there may be little to no delays caused by replication tools, such as the replication server 116. Because analytics may already be running on top of the in-memory system 120, there may be very little to no lag, for real time analytics.

Figure 2:
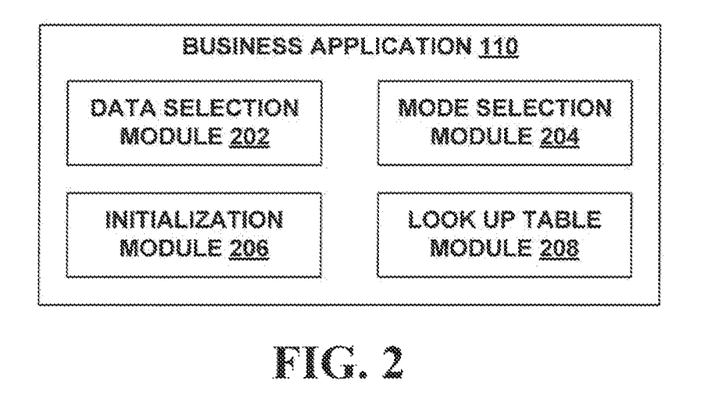
FIG. 2 is a block diagram illustrating example embodiment of a business application.
Figure 3A:
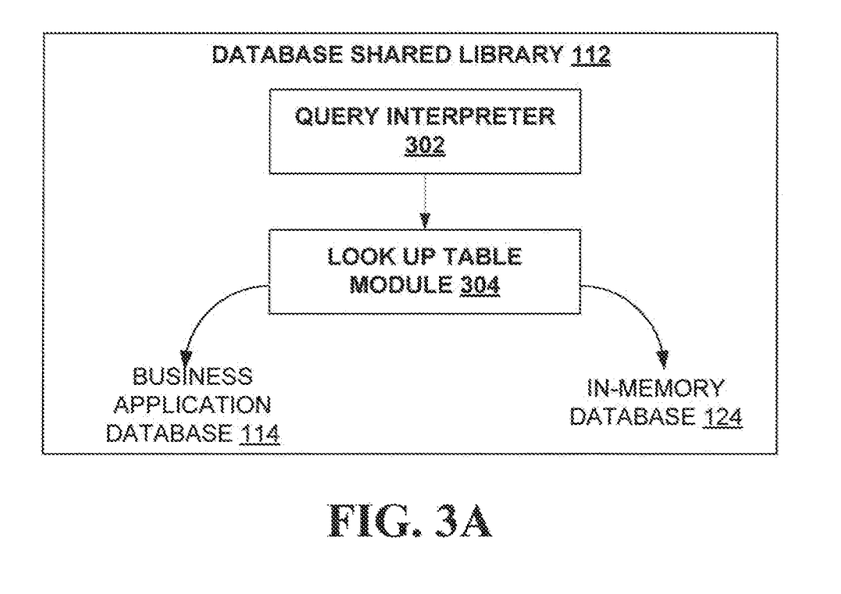
FIG. 3A is a block diagram illustrating an example embodiment of a database shared library.

FIG. 2 is a block diagram illustrating an example embodiment of the business application 110. The business application 110 may include a data selection module 202, a mode selection module 204, an initialization module 206, and a lookup table module 208.

The data selection module 202 may be configured to identify a selection of data stored in the business application database 114 to be used in conjunction with the in-memory database 124. For example, a user of the business application 110 may select which data from the business application database 114 to be replicated and consolidated with the in-memory database 124.

The mode selection module 204 may be configured to receive a selection of a storage mode corresponding to a dual system storage mode or a source system storage mode. The storage mode may correspond to how a user or developer may wish how a business application interacts with its own business application database 114 and/or an in-memory database 124 of an in-memory database server 118. As previously discussed, a developer may be reluctant to migrate all valuable data from the business application 114 to another platform including the in-memory database server. As such, a developer may select a dual system storage mode as the storage mode. In the dual system storage mode, the business application 110 may operate on data from multiple databases (e.g., the business application database 114 and the in-memory database 124). In other words, data between the business application database 114 may be replicated to and from the in-memory database 124. In the source system storage mode, the business application 110 may operate on data from a single database source such as the business application, database 114 even though the data from business application database 114 is replicated in the in-memory database 124. Changes to data in the in-memory database 124 may be replicated back to the business application database 114.

The initialization module 206 may be configured to initialize the selection of data in the in-memory database 124 by replicating the selection of data in the business application database 114 to the in-memory database 124.

The lookup table module 208 may be configured to generate an entry corresponding to the selection, of data in a lookup table when the dual system storage mode is selected. The look up table may be stored in the application server 108, in the in-memory database server 118, or in any other location accessible by the business application 110.

FIG. 3A is a block diagram illustrating an example embodiment of a database shared library 112. The database shared library 112 may include a query interpreter 302 and a lookup table module 304. The query interpreter 302 may be configured to receive and identify the data from which the query corresponds to. The query may be from the business application 110 for data from the business application database 114.

The query interpreter 303 may determine whether the lookup table in the business application 110 includes the data associated with the query. The database shared library 112 may route the query to the in-memory database 124 when the lookup table includes an entry corresponding to the data in the query. The database shared library 112 may route the query to the business application database 114 when the lookup table 304 does not include any entry corresponding to the data in the query.

Figure 3B:
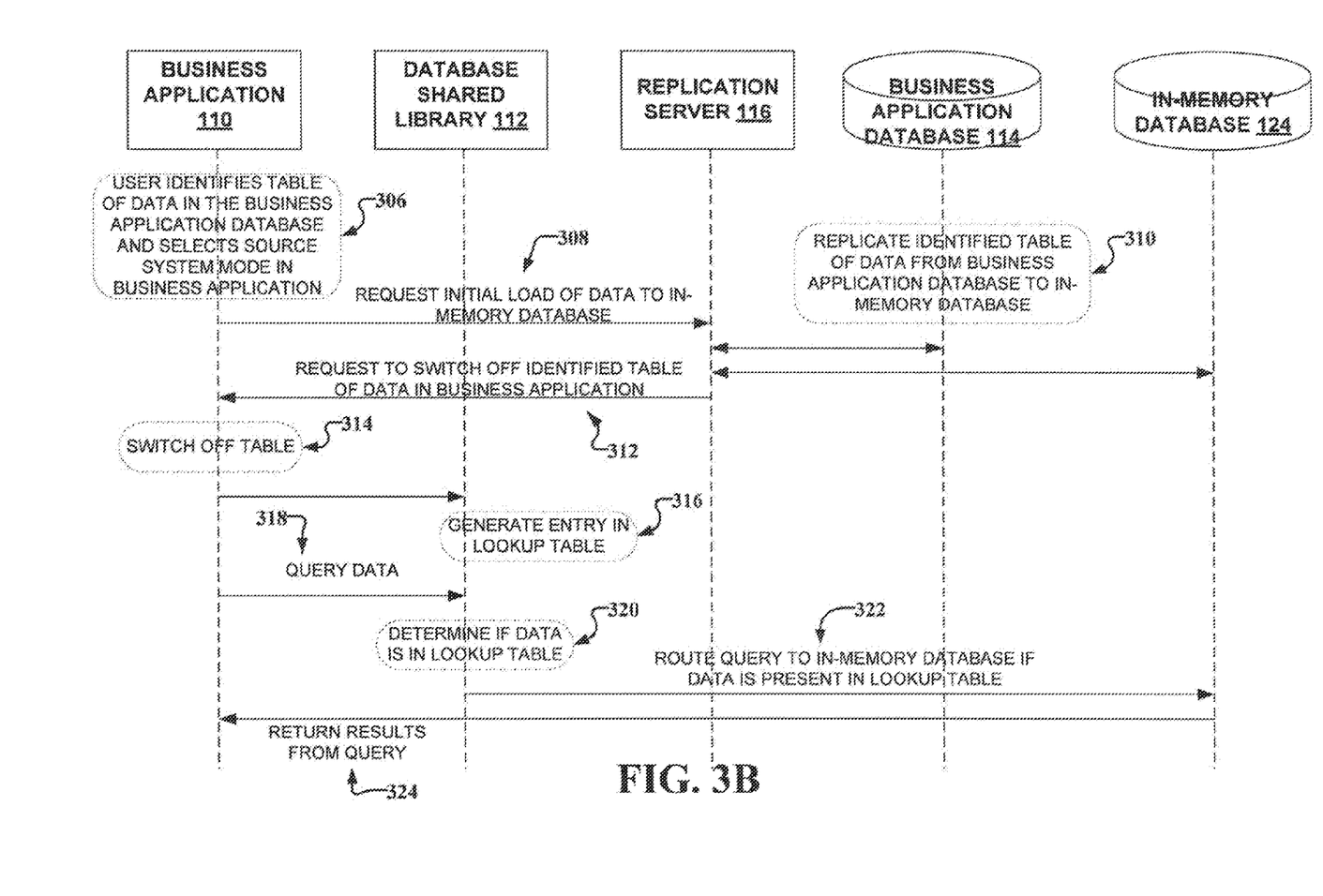
FIG. 3B is a ladder diagram illustrating an example operation of the database shared library.

FIG. 3B is a ladder diagram illustrating an example operation of the database shared library. For example, a new application is being developed where an existing process from the business application 110 is to be moved to the in-memory database 124 for faster processing. The logic of the business application 110 may be rewritten by using the standard tables and data model. The rewrite may consist of as new User Interface (UI) which would interact directly with the in-memory database 124. In one example, the business logic may be written in SQL Script in the in-memory system 120, which would select data based on user input, process the data, and write the data back to the database of the business application 114, and display the results to the UI.

As such the replication server 116 may be used as a replication tool between the business application 110 and the in-memory system 120. The replication server 116 may already be configured to replicate the data between the business application 110 and the in-memory system 120.

At operation 306, a developer or user of the new application may identify tables of data for the business application 110 that he needs for his new application. Using the in-memory application 122 of the in-memory system 120, the developer can identify and select the tables in the replication server data provisioning tool. One the tables are selected and marked for replication, the user may be prompted for one of the following two actions:

1. Original Replication (dual system storage mode), or
2. Switch off table in source system (source system storage mode).

If the user does not want to switch off the table in the business application 110, he may choose option 1. This would cause the replication server 116 to operate in the traditional manner (dual system storage mode): the replication server 116 would perform an initial load of the identified data and subsequently real time replication between the business application database 114 and the in-memory database 124 during subsequent operations.

If the user chooses option 2 by selecting the switch of table in the source system (source system storage mode), a command at operation 308 is first sent to replication server 116 to initiate an initial load of the identified data to the in-memory system 120. The replication server 116 thus replicates the identified or selected data from the business application database 114 to the in-memory database 124.

Once the initial load of the identified data is over and the selected data in the tables in both systems (the business application database 114 and the in-memory database 124) is the same, the replication server 116 sends a request at operation 312 to the business application 110 to switch off this table in the business application 110. The business application 110 then switches off the table at operation 314 and creates an entry for this table in the lookup table of the database shared library 112 at operation 316.

For every request 318 that comes from the business application 110 to select data or read data from this table, the DBSL layer (e.g., database shared library 112) may perform a check in the lookup table at operation 320. If an entry is present in the look up table, the request for data is routed to the in-memory database 124 (via a preconfigured connection to the in-memory database 124) at operation 322. If an entry is not present in the look up table, the request for data is passed on to the underlying database 114 of the business application 110 (not shown). The in-memory database 124 then returns results to the business application 110 at operation 324. In embodiment, the lookup table may reside in the business application 110 and/or the database shared library 112.

In summary, the in-memory system 120 may be a product that is being promoted. Business applications running on multiple database design may be excellent candidates in getting existing business application customers to migrate to the in-memory system 120 and get the customers to using the in-memory system 120.

Figure 4:
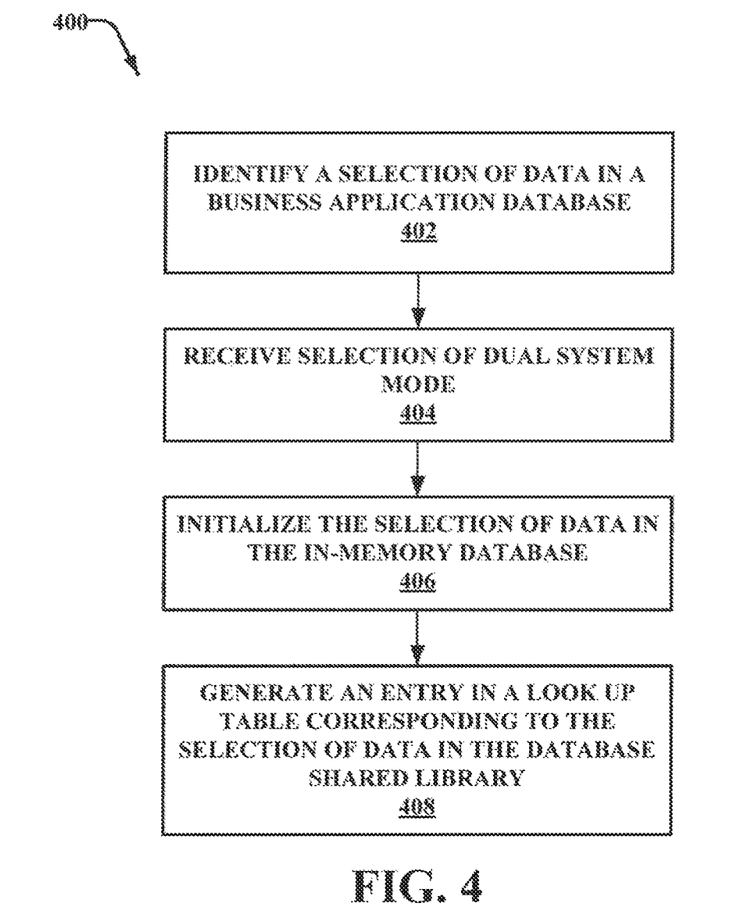
FIG. 4 is a flow diagram of an operation, in accordance with an example embodiment, for setting up a dual system mode.

FIG. 4 is a flow diagram of a method 400, in accordance with an example embodiment, for setting up a dual system mode.

At operation 402, a selection of data in a business application database is identified. In one embodiment the data selection module 202 of the business application 110 as illustrated in FIG. 2 performs the selection of data in response to a user input. In another embodiment, the selection of data may be performed automatically based on predefined parameters.

At operation 404, a selection of dual system mode is received. In one embodiment, the mode selection module 204 of the business application 110 as illustrated in FIG. 2 receives the selection of system mode from a user.

At operation 406, the selection of data is initialized in the in-memory database. In one embodiment, the initialization module 206 of the business application 110 as illustrated in FIG. 2 performs the initialization of the selection of data in the in-memory database.

At operation 408, an entry is generated in a look up table corresponding to the selection of data in the database shared library. In one embodiment, the look up table module 208 of the business application 110 as illustrated in FIG. 2 generates the entry in the look up table corresponding to the selection of data in the database shared library.

Figure 5:
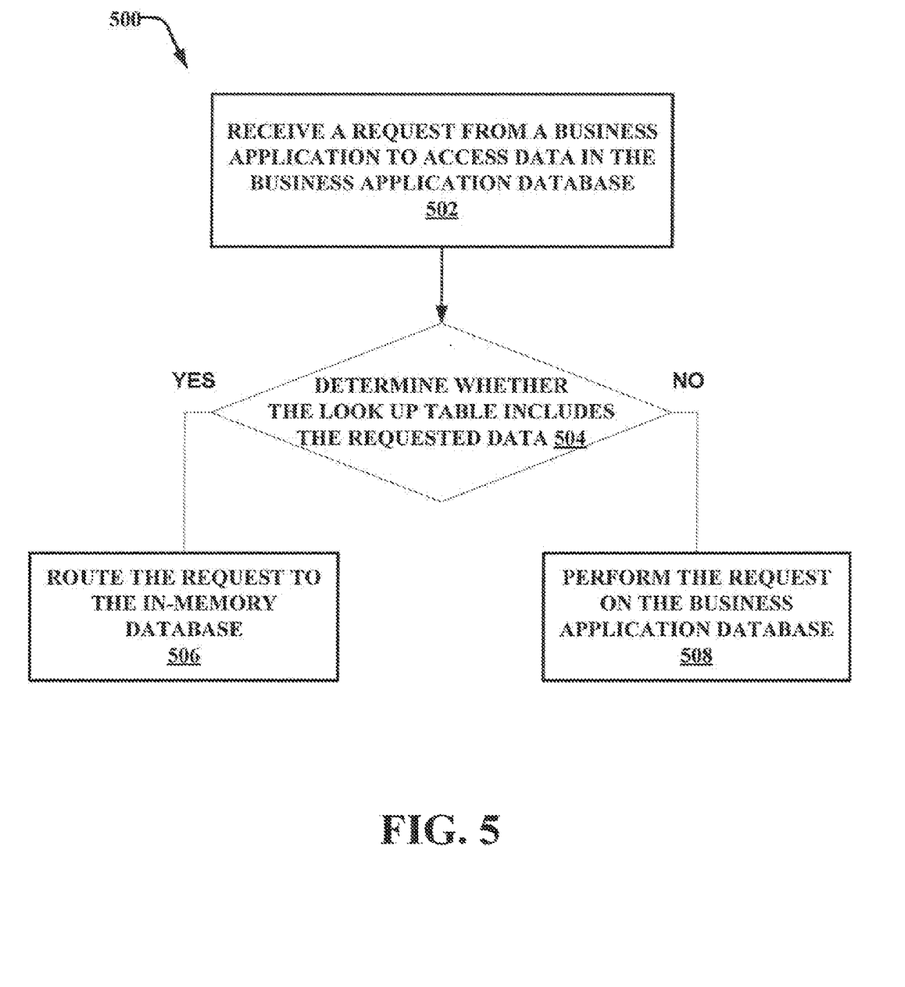
FIG. 5 is a flow diagram of an operation, in accordance with an example embodiment, for operating the database shared library.

FIG. 5 is a flow diagram of a method 500, in accordance with an example embodiment, for operating the database shared library module.

At operation 502, a request is received from a business application to access data in the business application database. In one embodiment, the query interpreter 302 of the database shared library 112 intercepts or receives the query from the business application or ERP system.

At operation 504, a determination is made as to whether the look up table includes the requested data. In one embodiment, the look up table module 304 of the database shared library 112 as illustrated in FIG. 3 determines whether the look up table includes the requested data.

At operation 506, if the data corresponds to an entry in the look up table, the request is routed to the in-memory database. In one embodiment, the look up table module 304 of the database shared library 112 as illustrated in FIG. 3 routes the request to the in-memory database 124.

At operation 508, if the data does not correspond to an entry in the look up table, the request is performed on the business application database 114. In one embodiment, the look up table module 304 of the database shared library 112 as illustrated in FIG. 3 routes the request to the business application database 114.

Figure 6:
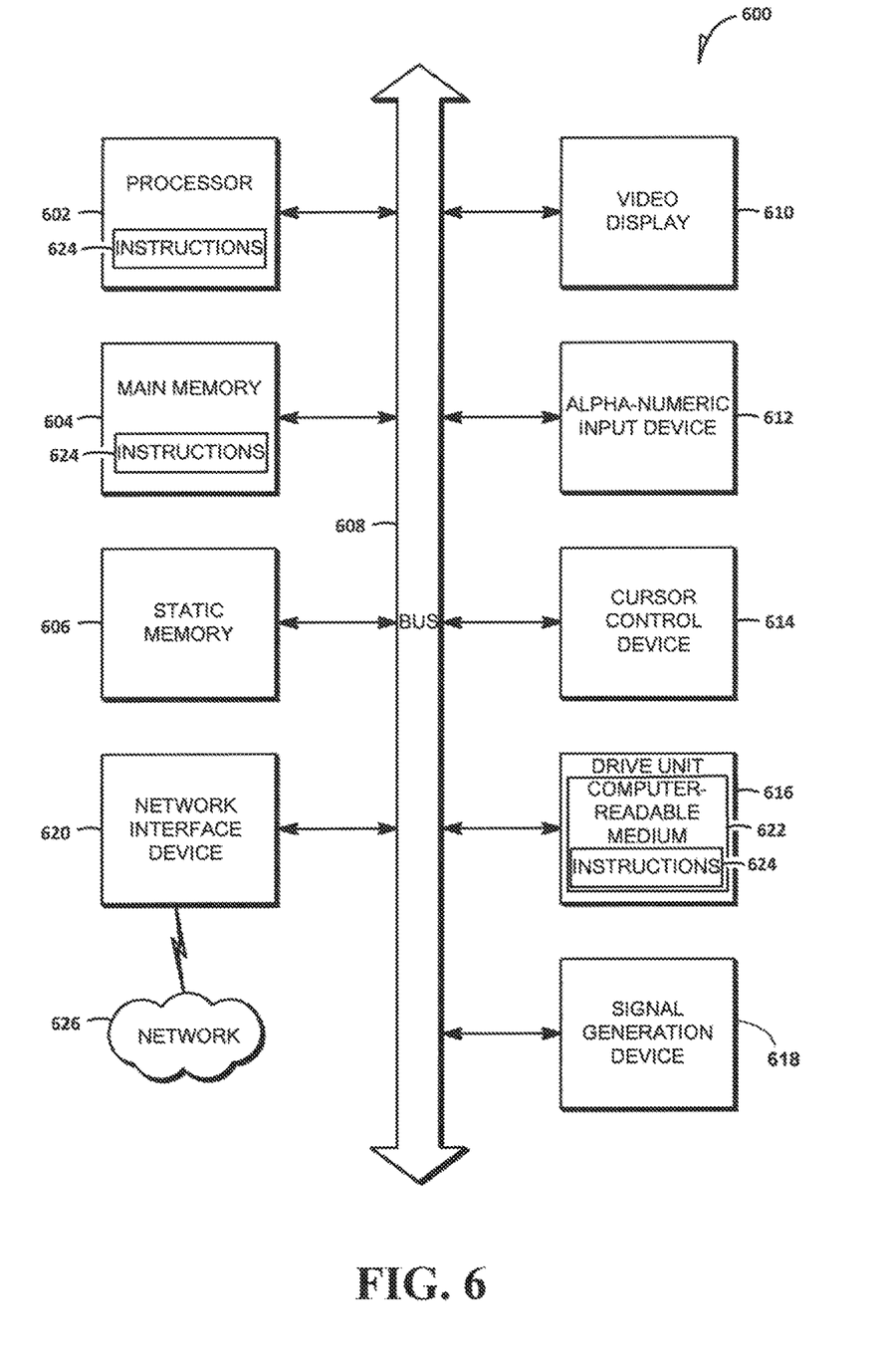
FIG. 6 is a block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed, in whole or in part. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform all or part of any one or more of the methodologies discussed herein.

The machine 600 includes a processor 602 (e.g., a central processing unit (CPU), as graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include, an alphanumeric input device 612 (e.g., as keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 embodying an one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 (e.g., network 190) via the network interlace device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as to combined structure or component. Similarly, structures and functionality presented as a single component may be implemented as separate components. These and other variations, modifications, additions, and improvements fall within the scope of the subject matter herein.

Certain embodiments are described herein as including logic or a number components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers has examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated, with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
   identifying a selection of data stored in a database to be used in conjunction with an in-memory database, the selection of data corresponding to an application;
   receiving a selection of a storage mode corresponding to a dual system storage mode or a source system storage mode, the storage mode being selectable by a user input and, upon selection of the dual system storage mode, the application interacts with both the database and the in-memory database, and wherein upon selection of the source system storage mode, the application interacts with the database only;
   replicating, by a replication server, the selection of data in the in-memory database; and
   based on the dual system storage mode being selected:
      generating an entry corresponding to the selection of data in a connection layer lookup table of a database connection layer;
      in response to instructions from the replication server, switching off an application lookup table used by the application to find the selection of data in the database;
      receiving a query from the application for a portion of the selection of data;
      determining whether the connection layer lookup table includes an entry corresponding to the portion of the selection of data;
      routing the query to the in-memory database based on the connection layer lookup table including an entry corresponding to the portion of the selection of data; and
      routing the query to the database based on the connection layer lookup table not including an entry corresponding to the portion of the selection of data.

2. The computer-implemented method of claim 1, further comprising:
   accessing and updating data from the selection of data in the database; and
   replicating, by the replication server, the updated data from the selection of data in the database to the in-memory database based on the source system storage mode being selected.

3. The computer-implemented method of claim 1, further comprising verifying that the selection of data is the same in both the database and the in-memory database after the replicating.

4. The computer-implemented method of claim 1, wherein the application is a business application and the database is a business application database.

5. The computer-implemented method of claim 1, further comprising:
   building a new application based on the selection of data in the in-memory database;
   generating new data using the new application; and
   storing the new data directly in the in-memory database without replicating the new data from the in-memory database back to the database.

6. A system comprising:
   one or more hardware processors;
   a storage device comprising a database;
   an in-memory system comprising an in-memory database;
   an application implemented by the one or more hardware processors and configured to:
      identify a selection of data stored in the database to be used in conjunction with the in-memory database, the selection of data corresponding to the application,
      receive a selection of a storage mode corresponding to a dual system storage mode or a source system storage mode, the storage mode being selectable by a user input and, upon selection of the dual system storage mode, the application interacts with both the database and the in-memory database, and wherein upon selection of the source storage system mode, the application interacts with the database only; and
a replication server configured to replicate the selection of data in the in-memory database;
the application being further configured to, based on the dual system storage mode being selected:
in response to instructions from the replication server, switching off an application lookup table used by the application to find the selection of data in the database;
receive a query from the application for a portion of the selection of data;
determine whether the connection layer lookup table includes an entry corresponding to the portion of the selection of data;
route the query to the in-memory database based on the connection layer lookup table including an entry corresponding to the portion of the selection of data; and
route the query to the database based on the connection layer lookup table not including an entry corresponding to the portion of the selection of data.

7. The system of claim 6, wherein the replication server is configured to:
access and update data from the selection of data in the database; and
replicate the updated data from the selection of data in the database to the in-memory database based on the source system storage mode being selected.

8. The system of claim 6, wherein the application is configured to verify that the selection of data is the same in both the database and the in-memory database after the replicating.

9. The system of claim 6, wherein the application is a business application and the database is a business application database.

10. The system of claim 6, wherein the application is further configured to build a new application based on the selection of data in the in-memory database, to generate new data using the new application, and to store the new data directly in the in-memory database without replicating the new data from the in-memory database back to the database.

11. A non-transitory machine-readable storage medium storing instructions which, when executed by at least one processor, performs operations comprising:
identifying a selection of data stored in a database to be used in conjunction with an in-memory database, the selection of data corresponding to an application;
receiving a selection of a storage mode corresponding to a dual system storage mode or a source system storage mode, the storage mode being selectable by a user input and, upon selection of the dual system storage mode, the application interacts with both the database and the in-memory database, and wherein upon selection of the source storage system mode, the application interacts with the database only; and
based on the dual system storage mode being selected:
replicating, by a replication server, the selection of data in the in-memory database;
generating an entry corresponding to the selection of data in a connection layer lookup table of a database connection layer;
in response to instructions from the replication server, switching off an application lookup table used by the application to find the selection of data in the database;
receiving a query from the application for a portion of the selection of data;
determining whether the connection layer lookup table includes an entry corresponding to the portion of the selection of data;
routing the query to the in-memory database based on the connection layer lookup table including an entry corresponding to the portion of the selection of data; and
routing the query to the database based on the connection layer lookup table not including an entry corresponding to the portion of the selection of data.

12. The non-transitory machine-readable storage medium of claim 11, wherein the operations further comprise:
accessing and updating data from the selection of data in the database; and
replicating, by the replication server, the updated data from the selection of data in the database to the in-memory database based on the source system storage mode being selected.

13. The non-transitory machine-readable storage medium of claim 11, wherein the operations further comprise verifying that the selection of data is the same in both the database and the in-memory database after the replicating.

14. The non-transitory machine-readable storage medium of claim 11, wherein the application is a business application and the database is a business application database.

15. The non-transitory machine-readable storage medium of claim 11, wherein the operations further comprise:
building a new application based on the selection of data in the in-memory database;
generating new data using the new application; and
storing the new data directly in the in-memory database without replicating the new data from the in-memory database back to the database.

* * * * *